US009251171B2

(12) United States Patent
Ding et al.

(10) Patent No.: US 9,251,171 B2
(45) Date of Patent: Feb. 2, 2016

(54) PROPAGATING IMAGE SIGNALS TO IMAGES

(71) Applicant: Google Inc., Mountain View, CA (US)

(72) Inventors: Zhongli Ding, Mountain View, CA (US); Gabriel Wolosin, San Mateo, CA (US); John R. Zhang, New York, NY (US); Charles J. Rosenberg, Cupertino, CA (US); Yang Song, San Jose, CA (US)

(73) Assignee: Google Inc., Mountain View, CA (US)

( * ) Notice: Subject to any disclaimer, the term of this patent is extended or adjusted under 35 U.S.C. 154(b) by 118 days.

(21) Appl. No.: 13/690,404

(22) Filed: Nov. 30, 2012

(65) Prior Publication Data
US 2015/0169930 A1 Jun. 18, 2015

(51) Int. Cl.
G06K 9/00 (2006.01)
G06F 17/30 (2006.01)
H04N 5/66 (2006.01)

(52) U.S. Cl.
CPC .... *G06F 17/30256* (2013.01); *G06F 17/30244* (2013.01)

(58) Field of Classification Search
USPC ......... 382/100, 103, 112–116, 155, 162, 168, 382/172–173, 181, 189–195, 206, 209, 219, 382/224, 232, 254, 274, 276, 286–291, 382/305–306, 312; 455/418; 348/383, 629
See application file for complete search history.

(56) References Cited

U.S. PATENT DOCUMENTS

| 5,579,471 | A  | * | 11/1996 | Barber | G06F 17/3025 382/209 |
| 6,562,077 | B2 | * | 5/2003  | Bobrow | G06F 17/30011 382/306 |
| 6,674,905 | B1 | * | 1/2004  | Matsugu | G06T 7/0081 382/181 |
| 8,064,633 | B2 | * | 11/2011 | Noda | G06F 17/30265 348/383 |
| 8,385,689 | B2 | * | 2/2013  | Chandrashekar | G06K 9/4671 345/629 |
| 2010/0135582 | A1 | * | 6/2010  | Gokturk | G06F 17/30259 382/195 |
| 2010/0317332 | A1 | * | 12/2010 | Bathiche | H04L 12/282 455/418 |

OTHER PUBLICATIONS

Määttä, J. et al., "Face Spoofing Detection From Single Images Using Micro-Texture Analysis" (online) [Retrieved on May 17, 2013]. Retrieved from the internet: <www.ee.oulu.fi/research/mvmp/mvg/files/pdf/131.pdf>, 7 pages.

(Continued)

*Primary Examiner* — Seyed Azarian
(74) *Attorney, Agent, or Firm* — Fish & Richardson P.C.

(57) ABSTRACT

Methods, systems and apparatus for identifying modified images based on seed images that are known to be modified images. In an aspect, a method includes accessing data identifying a set of first seed images; for each first seed image, determining a respective first set of similar images from images in an image corpus, each similar image having a visual similarity score that is a measure of visual similarity of the similar image to the first seed image based on the image content of the similar image and the first seed image that satisfies a first seed image similarity threshold; and for each similar image in each respective first set of similar images, attributing to the similar image signal data of each first seed image for which the similar image has a respective visual similarity score satisfying the first seed image similarity threshold.

17 Claims, 3 Drawing Sheets

(56) References Cited

OTHER PUBLICATIONS

Zhang and Liu, "Detecting Irregularities by image contour Based on Fuzzy Neural Network." The 3rd International Conference on Innovative Computing Information and Control (ICICIC'08), IEEE Computer Society, 4 pages.

* cited by examiner

PROPAGATING IMAGE SIGNALS TO IMAGES

BACKGROUND

This specification relates to classifying image data, such as still images and videos.

The Internet provides access to a wide variety of resources such as video or audio files, web pages for particular subjects, book articles, or news articles. There are many resources available, and to help users find resources that may be of interest to them, many companies have developed search systems that identify resources in response to a query. For textual searches, search queries usually are terms and phrases. For image searches, such as search of still images and videos, the search queries can be images, or terms and phrases, or a combination of images, terms and phrases. A search system ranks the resources in response to the query and provides search results that link to the identified resources. The search results are typically ordered for viewing according to the rank.

SUMMARY

In general, one aspect of the subject matter described in this specification can be implemented in methods that include the actions of accessing data identifying a set of first seed images, each first seed image being classified as belonging to a first category of images based on signal data of the first seed image that are independent of image content of the first seed image, and wherein the set of first seed images is a proper subset of images in an image corpus; for each first seed image: determining a respective first set of similar images from images in the image corpus, each similar image in the respective first set of images having a visual similarity score that is a measure of visual similarity of the similar image to the first seed image based on the image content of the similar image and the first seed image, and that satisfies a first seed image similarity threshold; and for each similar image in each respective first set of similar images: attributing to the similar image the signal data of each first seed image for which the similar image has a respective visual similarity score satisfying the first seed image similarity threshold. This and other embodiments of this aspect include corresponding systems, apparatus, and computer program products.

Particular embodiments of the subject matter described in this specification can be implemented so as to realize one or more of the following advantages. Spoofy images can be identified even when such images do not have associated traffic signal data, labels and/or text that are used to identify spoofy images. For example, a newly created spoofy image may have little or no traffic signal data available and no labels that identify the image as spoofy; however, using the attribution techniques described in this document, the newly created spoofy image can be classified as a spoofy image and appropriate search processing steps can be implemented. Furthermore, aggregation techniques for data from multiple images can reduce uncertainty, as the aggregation results in a larger set of attributed data that is less susceptible to noise. Finally, aggregation can be continually updated among images so that image data that is collected for a particular image is propagated to other images, which, in turn, reduces susceptibility to noise.

The details of one or more embodiments are set forth in the accompanying drawings and the description below. Other features, aspects, and advantages will be apparent from the description and drawings, and from the claims.

DESCRIPTION OF DRAWINGS

Like reference symbols in the various drawings indicate like elements.

DETAILED DESCRIPTION

Figure 1A:
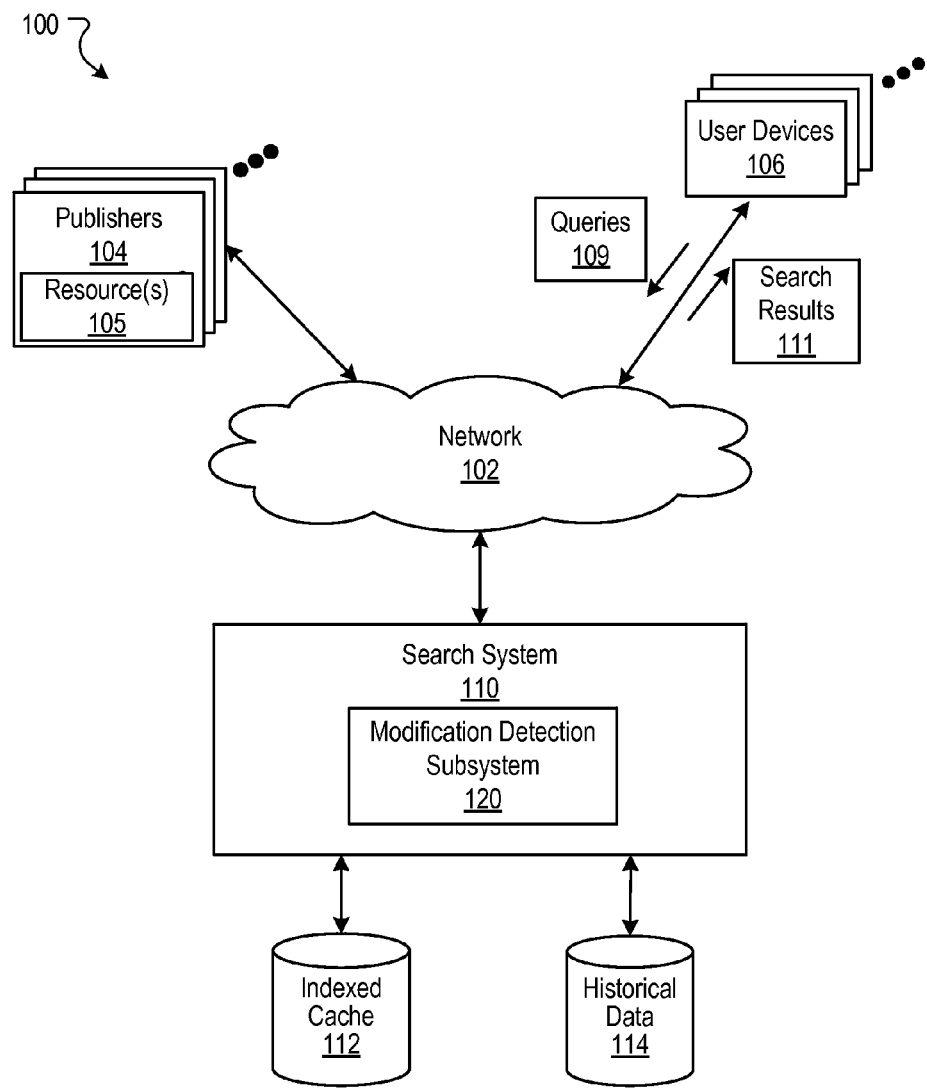
FIG. 1A is a block diagram of an example environment in which a modification detection subsystem can be used.

As described above, a search system may rank resources in response to a query. The ranking process may include ranking resources based on the performance of the resource with respect to the particular query. For example, some search systems rank resources having a selection rate, or a high hover rate, for a particular query higher than resources having a lower selection rate or hover rate for the particular query. The general assumption under such an approach is that queries are often an incomplete expression of the information needed, and the user's actions of selecting a particular resource is a signal that the resource is at least as responsive to, or more responsive to, the user's informational need than the other identified resources.

Image resources may be modified to create modified images. The modifications may be characterized according to types. For example, some modifications may preserve the content of the image but may adjust color, contrast or lighting. Such modifications are characterized as image quality modifications. Another type of modification is characterized as "spoofy" modifications. An image with a spoofy modification, or simply a "spoof" or "spoofy image," is an image that has been modified in a subtle (or not so subtle) way to convey a satirical, political, or even an offensive message. Typically an image with a spoofy modification will not satisfy a user's informational need, unless the user is searching for spoofy images. Thus, unless a search system has information indicating that a user is searching for spoofy images, the search system will demote spoofy images when ranking images responsive to a query.

The subject matter described below relates to a process to identify modified images based on visual similarity to known modified images. In the sections that follow, the subject matter is described in the example context of spoofy modifications. An image is defined as spoofy when an obvious modification is made to its canonical version so as to convey a humorous or offensive message. As used herein, an "image" or "image data" may refer to a still image, such as a picture, an animated image, such as an animated GIF, or even a video.

Identifying spoofy images based on the image content alone is difficult. For example, an image may be subtly modified to create a spoofy image, such as by adding moustache to the face of political figure. These modifications may be difficult to classify based on a computer visual feature analysis of the image alone.

One existing technique for identifying spoofy images is analyzing signal data. Signal data can include traffic signal data that describes user behavior in the context of particular queries. Based on the analysis of the traffic signal data, more explicit signal data, such as labels or measurements indicating a likelihood that an image is spoofy, can be generated. However, only a relatively small amount of spoofy images in a large image corpus are identified in this manner.

A system incorporating the subject matter takes known spoofy images, referred to as seed images, and identifies images that are similar to each seed image. Each similar image is then attributed the signal data of each seed image that was used to identify the similar image. The signal data attributed to seed image is then used to determine whether the similar image is a spoofy image, or perform other operations on the image that take into account the attributed signal data.

Signal data aggregation techniques can be used when an image is similar to multiple seed images. Furthermore, signal data from images that are known to not be spoofy images can also be attributed to the images. Both sets of signal data can then be used to determine whether the similar image is a spoofy image, or perform other operations on the image that take into account the attributed signal data.

FIG. 1A is a block diagram of an example environment 100 in which a modification detection subsystem 120 can be used. The example environment 100 includes a network 102, e.g., a local area network (LAN), wide area network (WAN), the Internet, or a combination of them, connects publishers 104, user devices 106, and the search system 110. The environment 100 may include many thousands of publishers 104 and user devices 106. The modification detection subsystem 120 is shown as a component of the search system 110; however, the subsystem 120 may be implemented as a system that is separate from the search system 110.

A publisher 104 is a website of one or more resources associated with a domain name and hosted by one or more servers. An example website is a collection of web pages formatted in hypertext markup language (HTML) that can contain text, images, multimedia content, and programming elements, e.g., scripts. Each website is maintained by a publisher 104, e.g., an entity that manages and/or owns the website. Throughout this document the term "publisher" may be used interchangeably with "website."

A resource is any data that can be provided by the website 104 over the network 102 and that is associated with a resource address. Resources include HTML pages, documents, feed sources, and image data, such as still images or video, to name just a few.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources, the search system 110 identifies the resources by crawling and indexing the resources provided by the publishers 104. Data about the resources can be indexed based on the resource to which the data corresponds. The indexed and, optionally, cached copies of the resources are stored in an indexed cache 112.

The user devices 106 submit search queries 109 to the search system 110. In response, the search system 110 accesses the indexed cache 112 to identify resources that are relevant to the search query 109. The search system 110 generates search results 111 that identify the resources responsive to the query and returns the search results 111 to the user devices 106. A search result 111 is data generated by the search system 110 that identifies a resource that is responsive to a particular search query, and includes a link to the resource. An example search result 111 can include a web page title, a snippet of text or a portion of an image extracted from the web page, and the URL of the web page.

The user devices 106 receive the search results, e.g., in the form of one or more web pages, and render the pages for presentation to users. In response to the user selecting a link in a search result at a user device 106, the user device 106 requests the resource identified by the link. The website 104 hosting the resource receives the request for the resource from the user device 106 and provides the resource to the requesting user device 106.

Search queries 109 submitted during user sessions are stored in a data store such as the historical data store 114. Selection data specifying actions taken in response to search results provided are also stored in a data store such as the historical data store 114. These actions can include whether a search result was selected, whether a search result was hovered over and if so for how long, and other user interactions taken with respect to search results. The data stored in the historical data store can be used to map search queries 109 submitted during search sessions to resources that were identified in search results 111 and the actions taken by users.

As described above, some images may be spoofy images, e.g., modifications of other images. The indexed cache may include data identifying known spoofy images. The identification of spoofy images may be performed by another subsystem of the search system 110, or by a system that is external to the search system 110. In either case, the resulting data identifying spoofy images is stored in the indexed cache, and the search system 110 uses this data to determine which images that are responsive to a query are spoofy, and whether to demote the images that are identified as such.

Images are constantly being added by the publishers, and thus there are many images that are detected for which there is little or no signal data available. For such images for which there is little or no signal data available, it is difficult for a detection system to determine if the image is a spoofy image based solely on the image content.

Thus, in some implementations, the search system 110 includes a modification detection subsystem 120 that is used to process seed images and find images that are visually similar to the seed images. The seed images are classified as belonging to a first category of images based on their respective signal data, and the classification is independent of image content of the seed images.

For example, each seed image is an image that has been classified as a spoofy image. The classification may be based on the traffic signal data of the respective images. For example, an image for which image search results exhibit a large number of "hovers" relative to other images for queries, but which also have a low number of selections (or some other click metric), may be classified as a spoofy image. Another traffic signal is the receiving of a large number of selections for reasons other than quality and relevance when provided as search results. Often such images, while not particularly relevant to a query and/or hosted on a low quality web page, receive selections in response to the visual modifications of the image. Such images are referred to as "click magnets," and are images that received of a disproportion number of selections relative to a quality measure of the image. Alternatively, an image for which search results have a relatively high number of selections for queries belonging to a certain category (e.g., humor, such as "Funny Images of the President"), but a relatively low number of selections for other categories (e.g., non-humor categories) may also be classified as a spoof. Various other click metrics, hover metrics, and other traffic signal metrics may be used to make these determinations.

Alternatively, the classification may be based on other signal data, such as labels provided for the image, or scores provided for the image. The signal data may be binary, such as a value of TRUE for spoof and a value of FALSE for not spoof, or may be a likelihood score, such as a probability or confidence score that the image is spoof.

For each image that is determined to be similar to a seed image, the detection subsystem 120 attributes to the similar image the signal data. Based on the attributed data, the detection subsystem 120 can perform one or more operations that take into account the attributed data. For example, the detection subsystem may generate a modification score for the similar image that is a measure of the likelihood that the image is a modified image. Alternatively or in addition, the detection subsystem 120 may take into account the attributed data when scoring the image for a search operation.

Figure 1B:
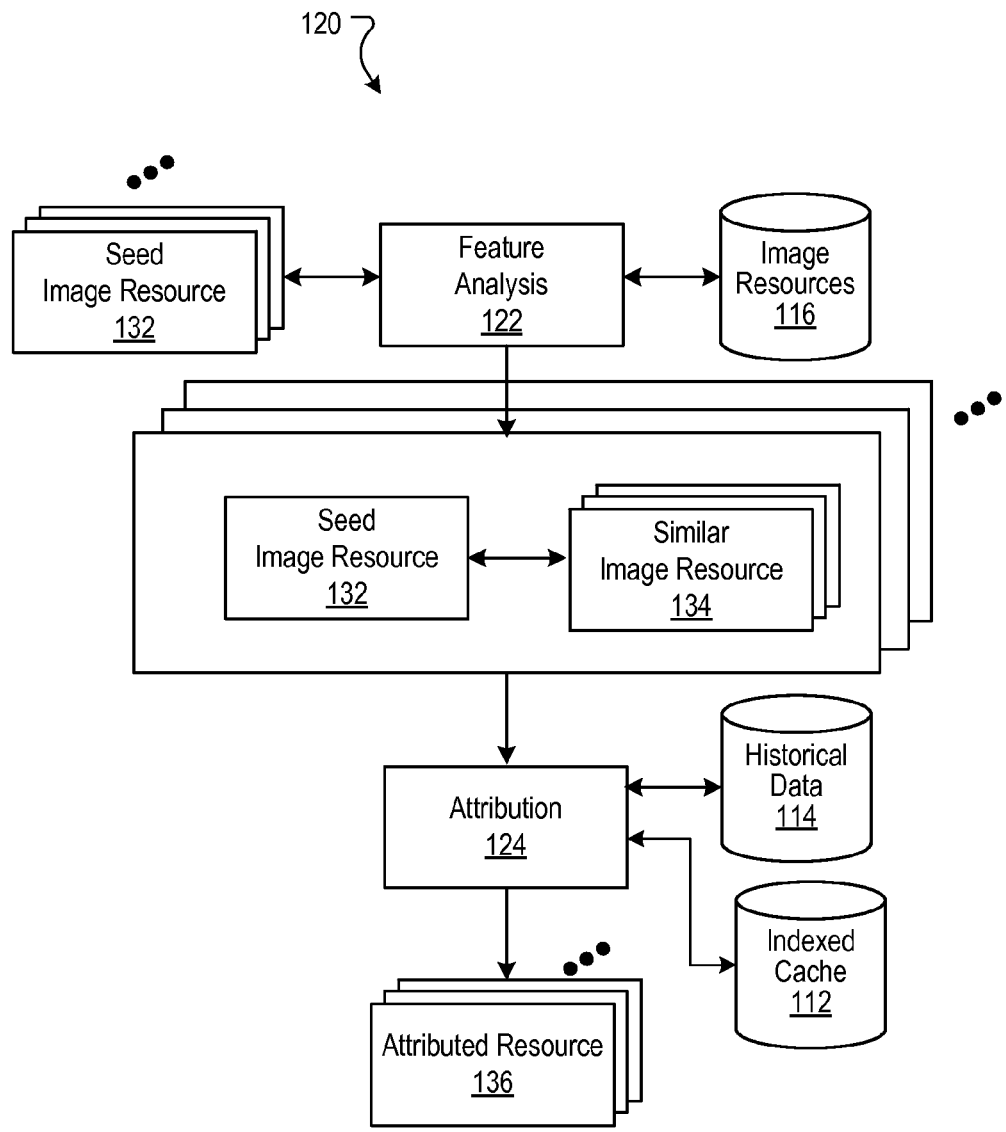
FIG. 1B is a block diagram of an example process flow in the modification detection subsystem.
Figure 2:
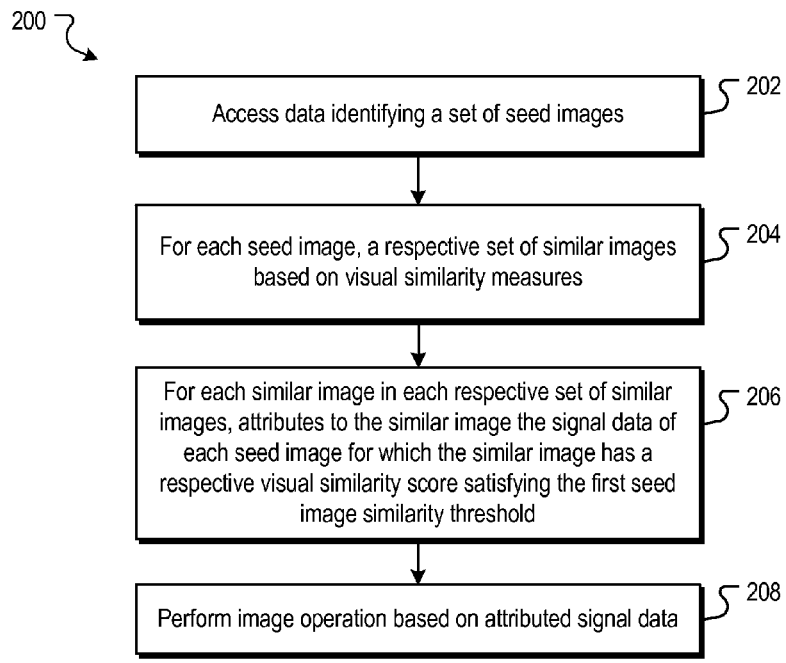
FIG. 2 is a flow diagram of an example process of attributing signal data and performing an image operation based on the attributed signal data.

Operation of the detection subsystem 120 is described with reference to FIG. 1B, which is a block diagram of an example process flow in the modification detection subsystem 120, and FIG. 2, which is a flow diagram 200 of an example process of attributing signal data and classifying image resources based on the attributed signal data.

In operation, the detection subsystem 120 accesses data identifying a set of seed images (202). For example, each seed image 132 is classified as belonging to a first category of images based on signal data of the first seed image. The signal data are independent of image content of the first seed image. For example, each seed image 132 may be classified as a spoofy image based on traffic signal data or other data, such as spoof labels, spoof likelihood measures, and binary spoof classifications.

The detection subsystem 120 determines, for each seed image, a respective set of similar images 134 based on visual similarity measures (204). For example, the detection subsystem 120, by use of one or more image feature analysis 122 techniques, may identify images that each has a visual similarity score that satisfies a first seed image similarity threshold. The visual similarity score is a measure of visual similarity of the similar image to the first seed image based on the image content of the similar image and the first seed image. Such feature analysis techniques that can be used to generate the visual similarity score include edge detection, blob detection, scale invariant feature transforms, and other image processing techniques. The similar images are selected from a larger corpus of image resources 116, such as images that have been indexed by the search system 110.

The detection subsystem 120, for each similar image 134 in each respective set of similar images, attributes to the similar image the signal data of each seed image for which the similar image has a respective visual similarity score satisfying the first seed image similarity threshold (206). For example, the signal data of a seed image is attributed to each similar image 134. If a particular image 134 is similar to two or more seed images, the signal data of each of the two or more seed images can be attributed to the similar image 134. Attribution of signal data is described in more detail with respect to FIG. 3 below.

The detection subsystem 130 performs an image operation based on the attributed signal data (208). A variety of image operations can be performed. One example is image classification, and another example is search ranking.

For image classification, the detection subsystem 130 may determine, for each similar image, whether the similar image belongs to the first category of images based on the image signal data attributed to the similar image, and classify only the similar images that are determined to belong to the first category as belonging to the first category of images. To illustrate, if the first category is spoofy images, the detection subsystem may classify only the similar images having a classification score, derived from the attributed signal data, that exceeds a classification threshold.

The classification score may be, for example, a likelihood that the image is a spoofy image. Each seed image 132 may be an image having a classification score that exceeds a first threshold likelihood, e.g., images with a 95% or greater likelihood of being a spoofy image. However, the classification threshold that is required to classify the similar image as a spoofy image may be less than the first threshold likelihood. For example, the classification score derived from the attributed signal data may be compared to a second likelihood that is less than the first likelihood, e.g., 70%, and similar images with a classification score of 70% or more may be classified as spoofy.

For search ranking, the search system 110 may use the signal data attributed to a similar image as an input to a scoring algorithm that takes into account such signal data when scoring images in response to queries. If the images have been classified, the search engine then may also take into account such classifications.

Figure 3:
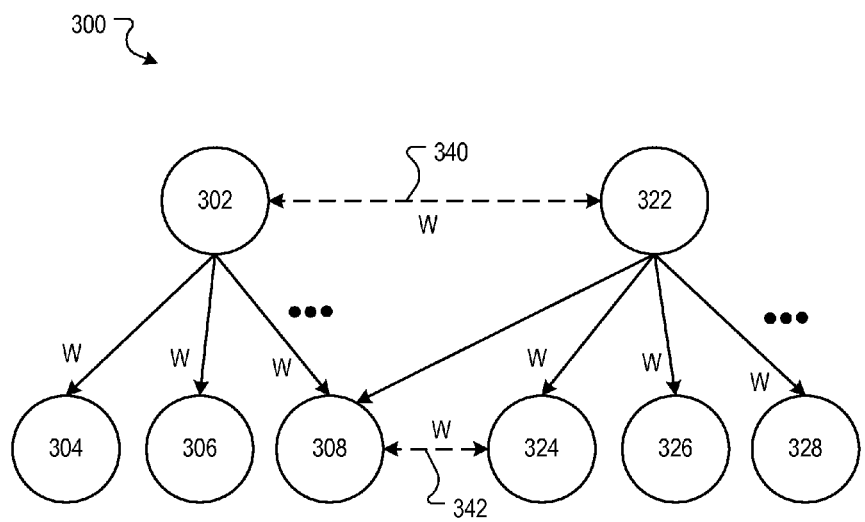
FIG. 3 is a block diagram of signal data attribution.

FIG. 3 is a block diagram 300 of signal data attribution. The attribution of signal data to a particular similar image can be done by, for example, aggregation, averaging, or other attribution techniques. The block diagram 300 illustrates several such techniques.

In FIG. 3, two seed images 302 and 322, have corresponding sets of similar images. For example, the seed image 302 has a respective set of similar images 304, 306, and 308. The seed image 322 has a respective set of similar images 308, 324, 326 and 328.

In one implementation, an attribution model attributes to each similar image only the signal data of the seed image(s) for which the similar image has a respective visual similarity score satisfying the first seed image similarity threshold. For example, image 308 has a first similarity score satisfying the first seed image similarity threshold for the seed image 302, and a second similarity score satisfying the first seed image similarity threshold for the seed image 322. Thus, the signal data for both seed images 302 and 322 are attributed to the similar image 308. Conversely, image 306 has only one similarity score satisfying the first seed image similarity threshold, and the similarity score is for seed image 302. Accordingly, image 306 is attributed only the signal data of the seed image 302.

Another implementation takes into account seed images that are determined to be similar to each other. For example, assume that seed images 302 and 322 are determined to satisfy a seed image similarity threshold, as indicated by the dashed line 340. The seed image similarity threshold is satisfied when a visual feature comparison of the seed image 302 and the seed image 322 generates a visual similarity score that meets or exceeds the seed image similarity threshold. In response to the two seed images 302 and 322 being so visually similar, the detection subsystem 120 attributes the signal data of both seed images 302 and 322 to each similar image in the respective subsets. Thus, similar image 304 would be attributed to the signal data of both seed images 302 and 322, as would 306, 308, 324, 326 and 328.

In another implementation, similar images that are determined to be visually similar to each other are attributed each other's attributed signal data. For example, assume that similar images 308 and 324 determined to satisfy a similar image similarity threshold, as indicated by the dashed line 342. In response to the two images 308 and 324 being so visually similar, the detection subsystem 120 attributes the signal data of image 308 to image 324, and the signal data of image 324 to the image 308.

The attribution of signal data may be done in a variety of appropriate ways, and may depend on the type of signal data used. For example, if the signal data are traffic data, such as selection counts, hover counts, etc., then the traffic data may be aggregated (summed) for each similar image. Furthermore, if an image receives signal data from two or more images, the traffic data may be averaged (or adjusted based on some other central tendency measure).

In some implementations, the visual similarity of an image to a seed image may also be used to scale or adjust the signal data attributed to the image. For example, as shown in FIG. 3, each image node is connected by an edge of weight W. The value of W for each edge is based on the measure of visual similarity of the two images the edge connects. For image pairs that have a very high visual similarity measure, the signal data may be fully attributed to the similar image. However, for image pairs that have a visual similarity measure that is relatively lower when compared to the very high visual similarity measure, the signal data may be partially attributed (e.g., less than 100% of the signal data).

In implementations in which the signal data are likelihoods of being spoofy, the likelihoods can be attributed among multiple image likelihoods as described above, and also averaged or scaled as described above.

In some implementations, in additional to seed images that are known to belong to a first category, second seed images that are known to not belong to the first category can also be used. The combined signal data of both images can then be used to determine whether an image belongs to the first category.

For example, with respect to FIG. 3, assume now that seed image 322 is an image that is determined to not be a spoofy image, and image 302 is an image that is known to be a spoofy image. Image 308 satisfies the seed similarity threshold for both seed images 302 and 322, and is thus attributed the signal data of both of the seed images 302 and 322. In implementations in which the signal data are binary labels (e.g., TRUE for spoofy (or modified), FALSE for not spoofy (or not modified)) a threshold number of TRUE values in excess of FALSE values may be required before the image 308 is classified as a spoofy image.

Additionally, aggregation can be continually updated among images so that image data that is collected for a particular image is propagated to other images. For example, as the images 302 and 322 receive additional clicks, hovers, and other actions that contribute to traffic data, the incremental data can be attributed to the respective images 304, 306, 308, 324, 326 and 328. Likewise, increment traffic data for the images 304, 306, 308, 324, 326 and 328 can be reflected back to the images 302 and 322.

While the examples above have been described in the context of still images, image data for videos can also be processed in a similar manner. For example, video frames can be sampled and indexed by time, and the result image data can be processed as described above.

Additional Implementation Details

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data.

Generally, a computer will also include, or be operatively coupled to receive data from or transfer data to, or both, one or more mass storage devices for storing data, e.g., magnetic, magneto-optical disks, or optical disks. However, a computer need not have such devices. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of what may be claimed, but rather as descriptions of features specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
   accessing, by a computer system, data identifying a set of first seed images, each first seed image being classified as belonging to a first category of images based on signal data of the first seed image that are independent of image content of the first seed image, and wherein the set of first seed images is a proper subset of images in an image corpus;
   for each first seed image:
      determining, by the computer system, a respective first set of similar images from images in the image corpus, each similar image in the respective first set of images having a visual similarity score that is a measure of visual similarity of the similar image to the first seed image based on the image content of the similar image and the first seed image, and that satisfies a first seed image similarity threshold; and
      for each similar image in each respective first set of similar images:
         attributing, by the computer system, to the similar image the signal data of each first seed image for which the similar image has a respective visual similarity score satisfying the first seed image similarity threshold;
         determining, by the computer system, whether the similar image belongs to the first category of images based on the image signal data attributed to the similar image; and
   classifying, by the computer system, only the similar images that are determined to belong the first category as belonging to the first category of images;
      wherein the first category of images are images that have been classified as spoof images.

2. The computer-implemented method of claim 1, wherein:
   each seed image is an image for which a classification score generated based on the signal data meets a first classification score threshold that corresponds to a first likelihood that an image belongs to the first category; and
   determining whether the similar image belongs to the first category of images based on the image signal data attributed to the similar image comprises:
      generating a classification score based on the signal data attributed to the similar image; and
      determining that the classification score meets at least a second classification score threshold that corresponds to a second likelihood that an image belongs to the first category, and wherein the second likelihood is less than the first likelihood.

3. The computer-implemented method of claim 1, further comprising:
   for each first seed image:
      determining a respective first set of similar seed images from the other first seed images, each similar seed image in the respective first set of similar seed images having a visual similarity score that is a measure of visual similarity of the similar seed image to the first seed image based on the image content of similar image and the first seed image, and that satisfies a first seed image similarity threshold; and
   wherein, for each similar image in each respective first set of similar images, attributing to the similar image the signal data of each first seed image comprises:
      attributing to the similar image the signal data of each first seed image for which the similar image has a respective visual similarity score satisfying the first seed image similarity threshold, and the signal data attributed to each first seed image from the similar seed images.

4. The computer-implemented method of claim 1, further comprising:
accessing data identifying a set of second seed images, each second seed image being classified as not belonging to the first category of images based on signal data of the second seed image that are independent of image content of the second seed image, and wherein the set of second seed images is a proper subset of images in an image corpus;
for each second seed image:
determining a respective second set of similar images from images in the image corpus, each similar image in the respective second set of images having a visual similarity score that is a measure of visual similarity of the similar image to the second seed image based on the image content of the similar image and the second seed image, and that satisfies a first seed image similarity threshold; and
for each similar image in each respective second set of similar images:
attributing to the similar image the signal data of each second seed image for which the similar image has a respective visual similarity score satisfying the second seed image similarity threshold; and
wherein determining whether the similar image belongs to the first category of images based on the image signal data attributed to the similar image comprises, for each similar image belonging a respective first set and a respective second set, determining whether the similar image belongs to the first category of images based on the image signal data attributed to the similar image from the first seed images and the second seed images.

5. The computer-implemented method of claim 1, wherein the signal data of the first seed images comprise click metric data indicative of one or more click metrics for the first seed image.

6. The computer-implemented method of claim 1, wherein the signal data of the first seed images comprise hover metric data indicative of one or more hover metrics for the first seed image.

7. The computer-implemented method of claim 1, wherein the signal data are data indicating an image that has received of a disproportion number of selections relative to a quality measure of the image.

8. The computer-implemented method of claim 1, wherein attributing to the similar image the signal data of each first seed image for which the similar image has a respective visual similarity score satisfying the first seed image similarity threshold comprises summing the signal data and associating the summed signal data with the similar image.

9. The computer-implemented method of claim 1, wherein attributing to the similar image the signal data of each first seed image for which the similar image has a respective visual similarity score satisfying the first seed image similarity threshold comprises generating a central tendency of the signal data and associating the central tendency of the signal data with the similar image.

10. The computer-implemented method of claim 1, wherein attributing to the similar image the signal data of each first seed image for which the similar image has a respective visual similarity score satisfying the first seed image similarity threshold comprises adjusting signal data of the first seed image attributed to the similar image by a value that is proportional to the visual similarity score of the similar image.

11. A system, comprising:
a data processing apparatus; and
a non-transitory memory storage apparatus in data communication with the data processing apparatus and storing instructions executable by the data processing apparatus and that upon such execution cause the data processing apparatus to perform operations comprising:
accessing data identifying a set of first seed images, each first seed image being classified as belonging to a first category of images based on signal data of the first seed image that are independent of image content of the first seed image, and wherein the set of first seed images is a proper subset of images in an image corpus;
for each first seed image:
determining a respective first set of similar images from images in the image corpus, each similar image in the respective first set of images having a visual similarity score that is a measure of visual similarity of the similar image to the first seed image based on the image content of the similar image and the first seed image, and that satisfies a first seed image similarity threshold; and
for each similar image in each respective first set of similar images:
attributing to the similar image the signal data of each first seed image for which the similar image has a respective visual similarity score satisfying the first seed image similarity threshold;
determining whether the similar image belongs to the first category of images based on the image signal data attributed to the similar image; and
classifying only the similar images that are determined to belong the first category as belonging to the first category of images;
wherein the first category of images are images that have been classified as spoof images.

12. The system of claim 11, wherein:
each seed image is an image for which a classification score generated based on the signal data meets a first classification score threshold that corresponds to a first likelihood that an image belongs to the first category; and
determining whether the similar image belongs to the first category of images based on the image signal data attributed to the similar image comprises:
generating a classification score based on the signal data attributed to the similar image; and
determining that the classification score meets at least a second classification score threshold that corresponds to a second likelihood that an image belongs to the first category, and wherein the second likelihood is less than the first likelihood.

13. The system of claim 11, the operations further comprising:
for each first seed image:
determining a respective first set of similar seed images from the other first seed images, each similar seed image in the respective first set of similar seed images having a visual similarity score that is a measure of visual similarity of the similar seed image to the first seed image based on the image content of similar image and the first seed image, and that satisfies a first seed image similarity threshold; and
wherein, for each similar image in each respective first set of similar images, attributing to the similar image the signal data of each first seed image comprises:

attributing to the similar image the signal data of each first seed image for which the similar image has a respective visual similarity score satisfying the first seed image similarity threshold, and the signal data attributed to each first seed image from the similar seed images.

14. The system of claim 11, the operations further comprising:
    accessing data identifying a set of second seed images, each second seed image being classified as not belonging to the first category of images based on signal data of the second seed image that are independent of image content of the second seed image, and wherein the set of second seed images is a proper subset of images in an image corpus;
    for each second seed image:
        determining a respective second set of similar images from images in the image corpus, each similar image in the respective second set of images having a visual similarity score that is a measure of visual similarity of the similar image to the second seed image based on the image content of the similar image and the second seed image, and that satisfies a first seed image similarity threshold; and
        for each similar image in each respective second set of similar images:
            attributing to the similar image the signal data of each second seed image for which the similar image has a respective visual similarity score satisfying the second seed image similarity threshold; and
    wherein determining whether the similar image belongs to the first category of images based on the image signal data attributed to the similar image comprises, for each similar image belonging a respective first set and a respective second set, determining whether the similar image belongs to the first category of images based on the image signal data attributed to the similar image from the first seed images and the second seed images.

15. The system of claim 11, wherein the signal data of the first seed images comprise hover metric data indicative of one or more hover metrics for the first seed image.

16. The system of claim 11, wherein attributing to the similar image the signal data of each first seed image for which the similar image has a respective visual similarity score satisfying the first seed image similarity threshold comprises adjusting signal data of the first seed image attributed to the similar image by a value that is proportional to the visual similarity score of the similar image.

17. A non-transitory memory storage apparatus storing instructions executable by a data processing apparatus and that upon such execution cause the data processing apparatus to perform operations comprising:
    accessing data identifying a set of first seed images, each first seed image being classified as belonging to a first category of images based on signal data of the first seed image that are independent of image content of the first seed image, and wherein the set of first seed images is a proper subset of images in an image corpus;
    for each first seed image:
    determining a respective first set of similar images from images in the image corpus, each similar image in the respective first set of images having a visual similarity score that is a measure of visual similarity of the similar image to the first seed image based on the image content of the similar image and the first seed image, and that satisfies a first seed image similarity threshold; and
    for each similar image in each respective first set of similar images:
    attributing to the similar image the signal data of each first seed image for which the similar image has a respective visual similarity score satisfying the first seed image similarity threshold;
    determining whether the similar image belongs to the first category of images based on the image signal data attributed to the similar image; and
    classifying only the similar images that are determined to belong the first category as belonging to the first category of images;
    wherein the first category of images are images that have been classified as spoof images.

* * * * *